EXTINCTION LENGTHS OF WATER

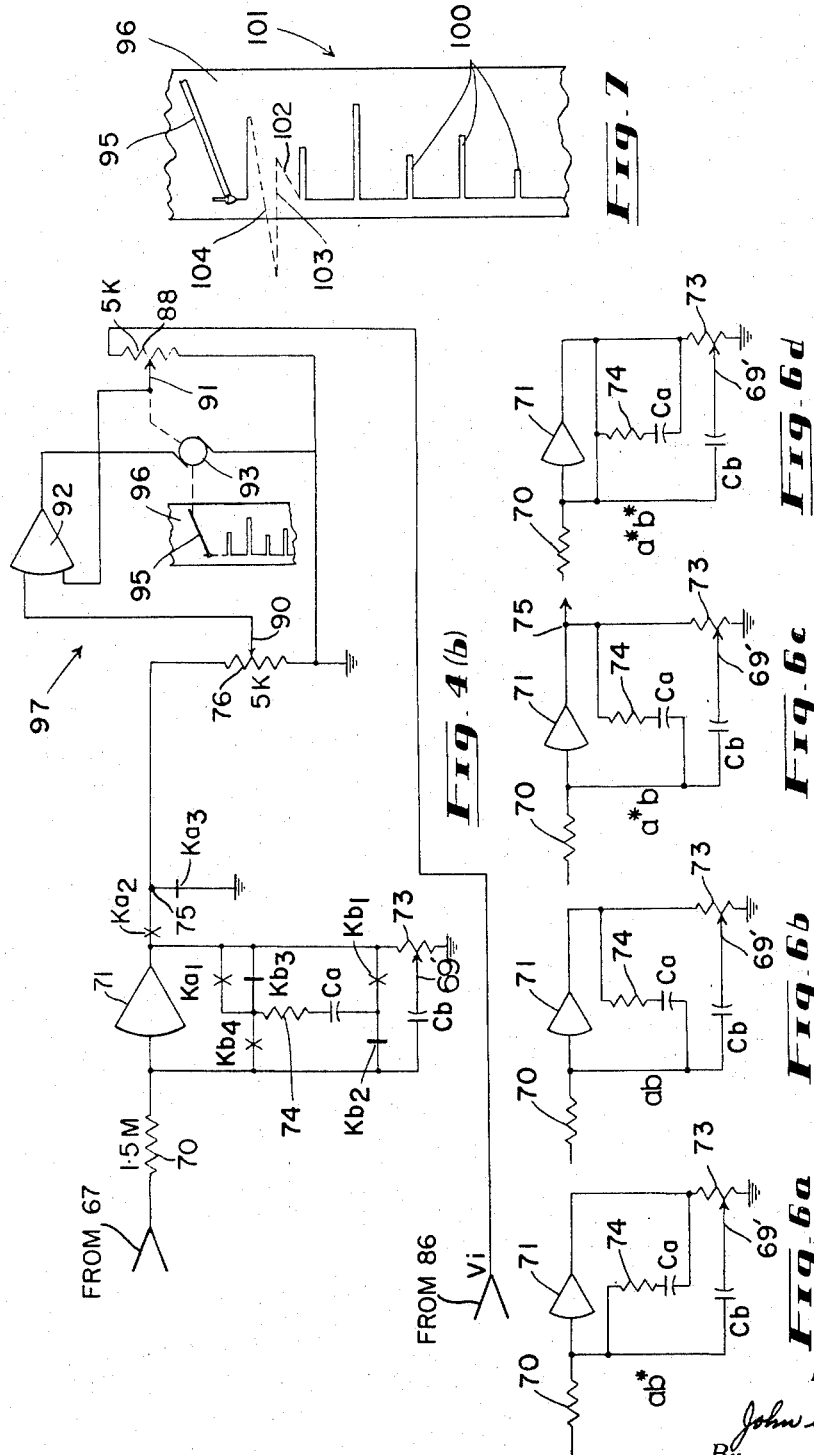

Nov. 12, 1968     J. G. BAYLY     3,411,012
INFRARED ABSORPTION DEVICE FOR DETECTING SMALL
CHANGES IN THE ISOTOPIC PURITY OF WATER
Filed July 9, 1965     7 Sheets-Sheet 7

Inventor
John G. Bayly
By
Cushman, Darby & Cushman
Attorneys

United States Patent Office 3,411,012
Patented Nov. 12, 1968

3,411,012
INFRARED ABSORPTION DEVICE FOR DETECTING SMALL CHANGES IN THE ISOTOPIC PURITY OF WATER
John G. Bayly, Deep River, Ontario, Canada, assignor to Atomic Energy of Canada Limited, Ottawa, Ontario, Canada, a corporation of Canada
Filed July 9, 1965, Ser. No. 470,688
Claims priority, application Canada, Sept. 1, 1964, 910,772
8 Claims. (Cl. 250—43.5)

ABSTRACT OF THE DISCLOSURE

An apparatus for measuring the concentration of a specific contaminant is described in which illumination from a source is passed through a sample cell into which may be introduced a test sample of the substance with an unknown concentration of contaminant and a sample of the same substance with a known concentration alterately. The radiation passing through the sample cell is led through a filter and falls on a detector. The output from the detector is then passed to a modulation detector which determines the variation in illumination caused by the test sample and the reference sample. Subsequently the filter is changed to pass a wavelength band in which it is known that the contaminant offers a different absorption to the radiation with respect to the absorption by the substance than in the first filter wavelength pass band. The two modulation signals are then compared and the compared output is dependent upon the unknown concentration of contaminant in the test sample.

Figure 1:
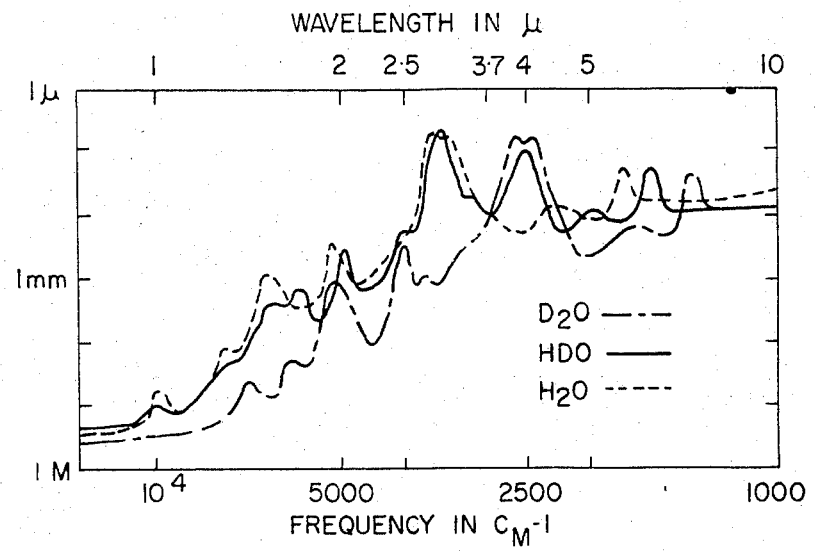

This invention relates to a device for measuring the concentration of a contaminating impurity in a substance and has particular reference to the detection of the presence of heavy water leakage into light water such as encountered in the coolant and control systems of nuclear reactors.

To achieve the required sensitivity, it is necessary to be able to detect the addition of one part $D_2O$ per million parts of natural water. Since natural water contains the equivalent of from 139 to 150 parts $D_2O$ per million, it is necessary to detect a change of less than 1% in deuterium content, i.e., a change which is comparable to the seasonal variation in composition.

The existing instruments for measuring the isotopic purity of natural water show fluctuations equivalent to those produced by concentration changes of 10 to 50 parts $D_2O$ per million. The fluctuations result from changes in temperature distributions, aging of the infrared source and detector, and a gradual deterioration of the sapphire windows. They can be partially reduced by frequent recalibration, but it has become apparent that only a completely new approach to the problem is likely to give the required increase in sensitivity with the stability essential in an on-stream instrument.

The basic reason for the limitations of the previous analysers was that while they used a null method, the null was based on signals from infra-red radiation which had traversed different paths, or had different wavelengths.

In the proposed new approach, the infra-red transmission properties of the water sample are directly compared with the same properties of a reference sample of water. The apparatus also includes means for eliminating the effects of dirt in the tested sample and reference sample, and of aging and window deterioration.

It is an object of the invention to provide an apparatus which will give a continuous reading of the concentration of a contaminating substance in a test sample and preferably includes a mechanism for providing the ratio of the difference in transmission between the test and reference samples to the means transmission through the test and reference samples at two closely spaced wavelengths.

More particularly in accordance with a preferred form of the invention the quantity of contaminant in a substance is measured by alternately passing electro-magnetic radiation through the contaminated substance and a test sample having a known quantity of contaminant in a first wave band in which the contaminant is known to produce a certain absorption different from that of pure substance, measuring the difference in transmission between the test and reference samples, subsequently passing radiation through said test and reference samples in a second wave band over which the relation between the absorption by contaminant and pure substance is different from that in the first wave band, measuring the difference in transmission occasioned between the two samples at the two wave bands and subtracting the second measured difference from the first measured difference.

In the description which follows reference will be made to the accompanying drawings in which:

FIGURE 1 shows a graph of the extinction length of electro-magnetic radiation through natural water and natural water contaminated with heavy water over the range of about $0.5\mu$ to $10\mu$.

Figure 2:
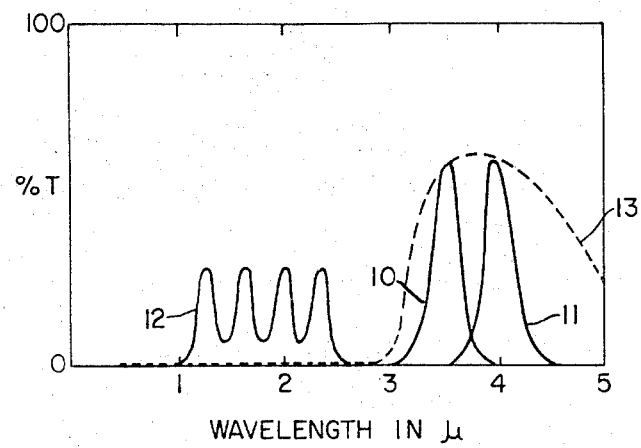
Figure 3:
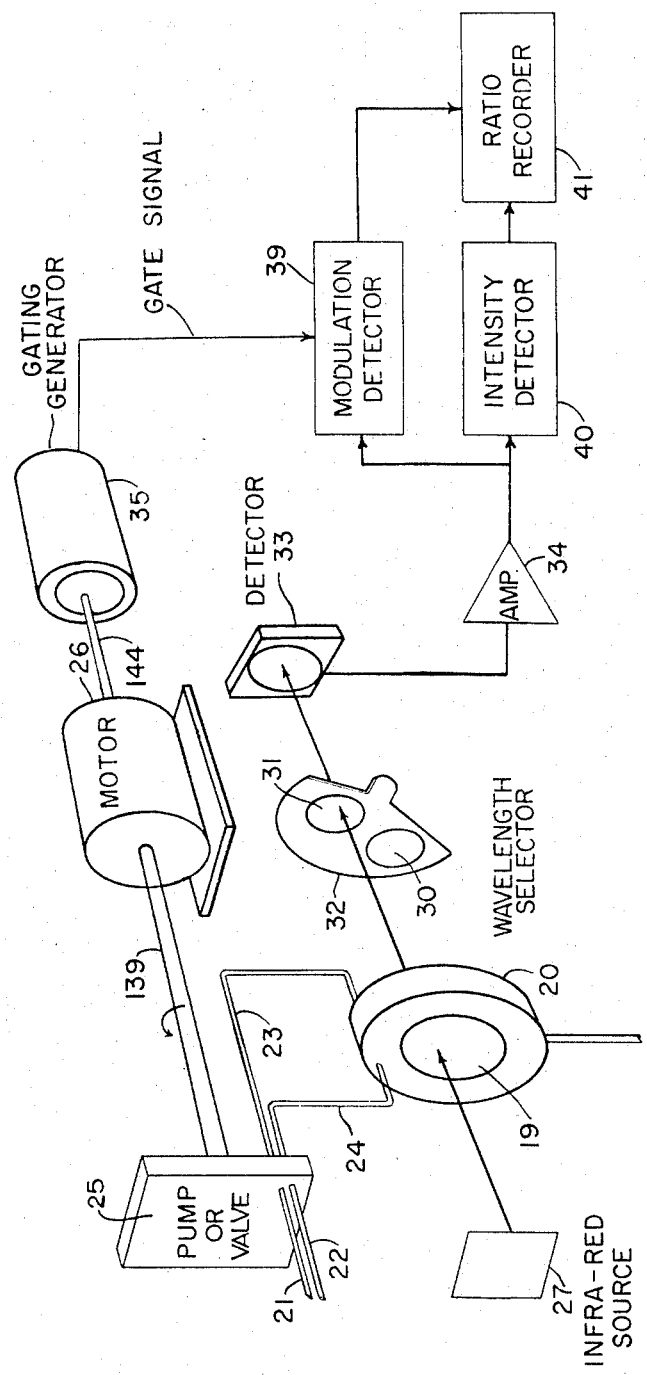
Figure 4A:
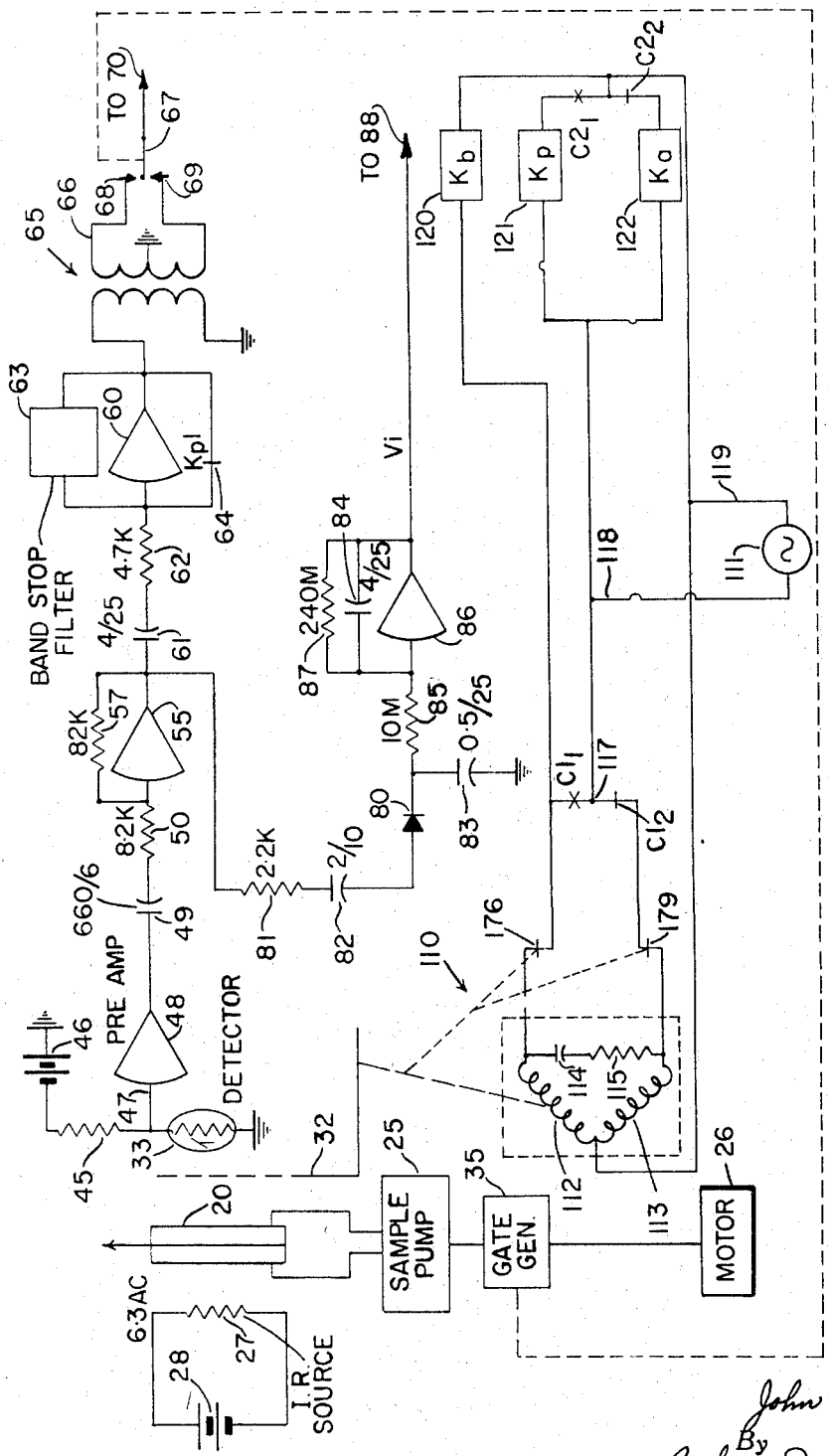
Figure 5:
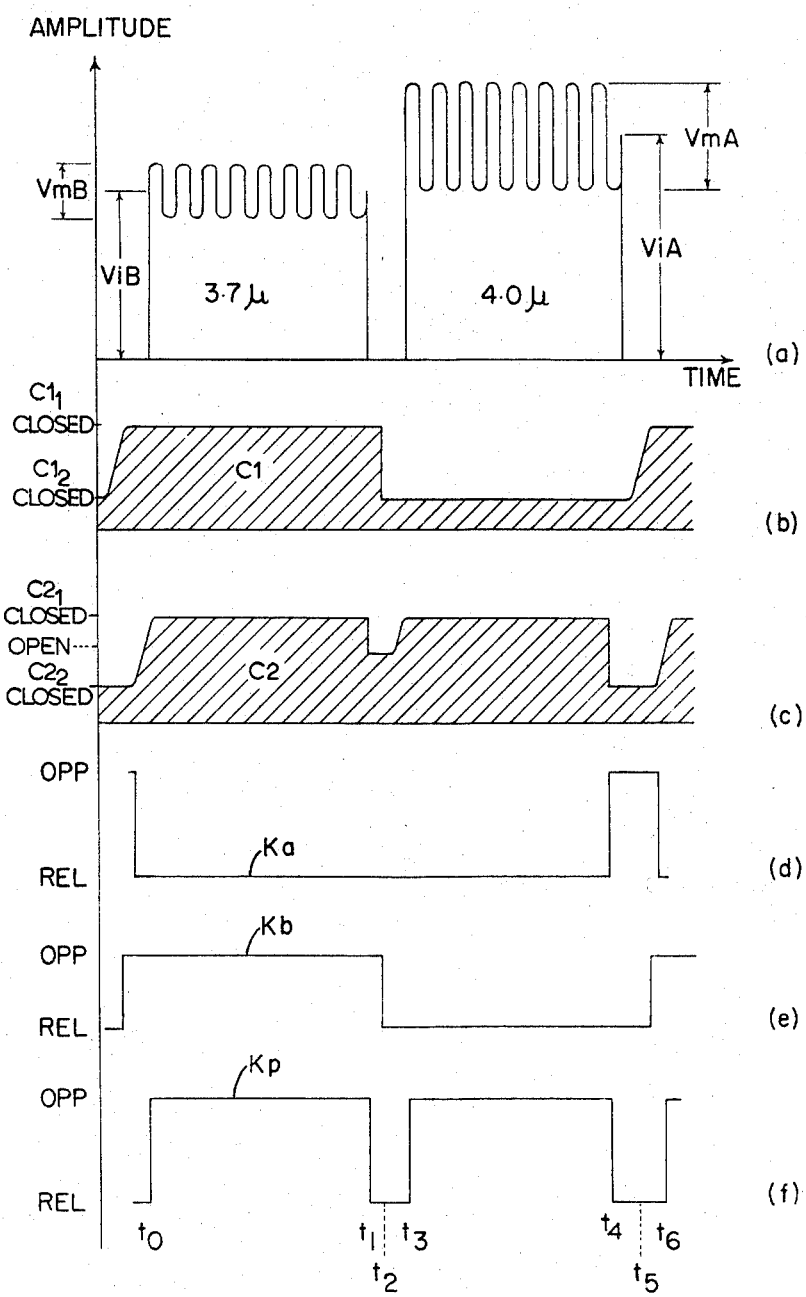
Figure 8:
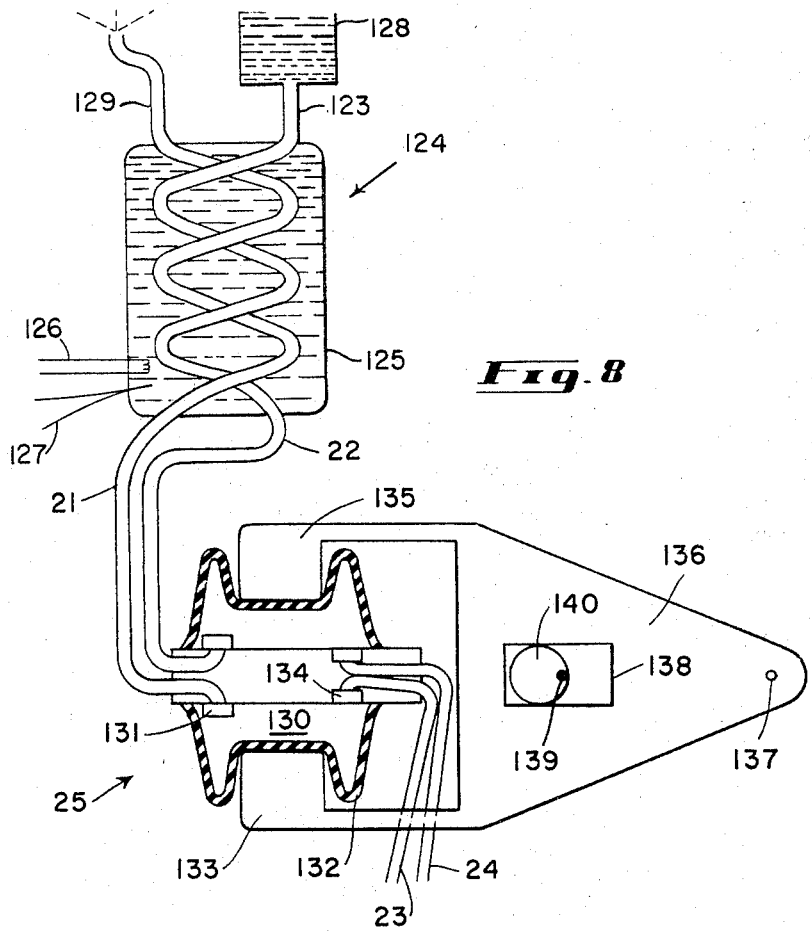
Figure 9:
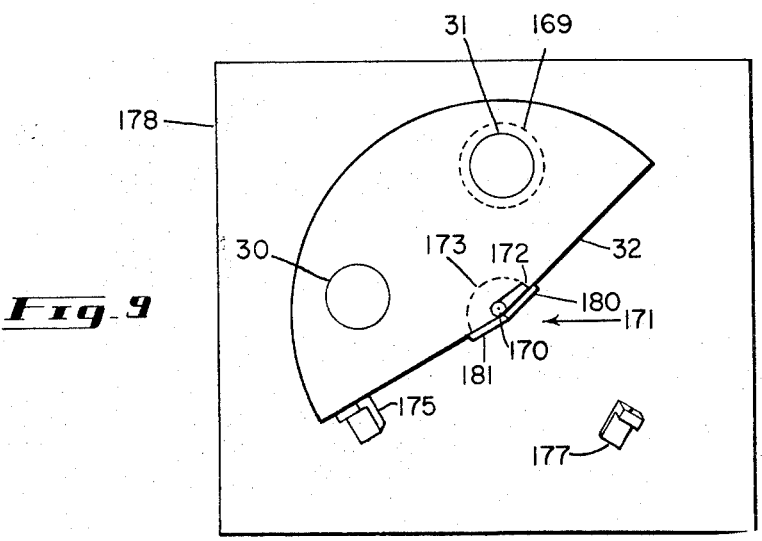
Figure 10:
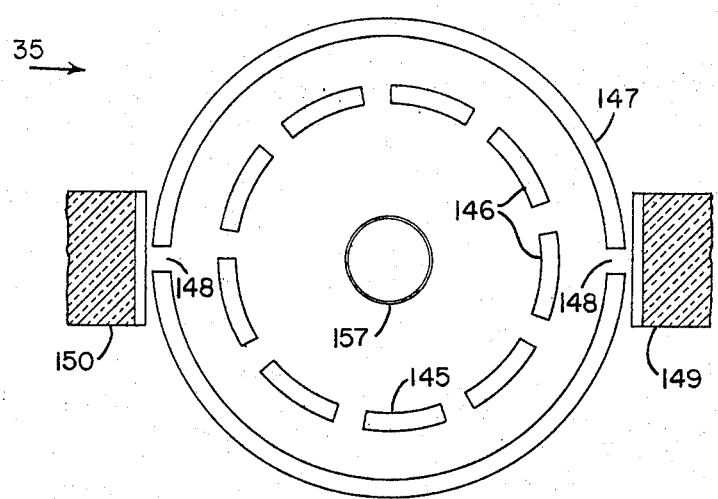
Figure 11:
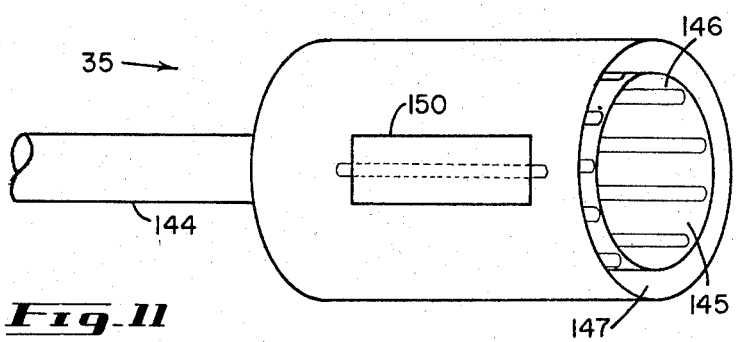
Figure 12:
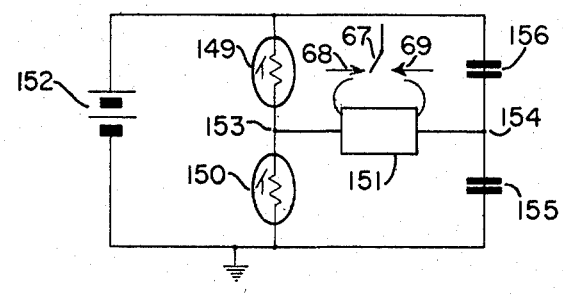

FIGURE 2 shows a graph of transmission through each of a pair of Fabry-Perrot filters and the transmission through a long wave pass filter used in conjunction with them, FIGURE 3 shows a partly schematic perspective diaggram of an apparatus for use in carrying out the invention together with associated electronic circuits shown in block diagrams, FIGURES 4a and 4b show a schematic circuit diagram of an apparatus constructed in accordance with the teaching of the invention, FIGURES 5a to 5f show the sequence of the operations, the cams, relays and the signal voltage for the circuit in FIGURE 4, FIGURES 6a to 6d (on the same sheet as FIGURE 4b) show schematic diagrams of the instantaneous circuit associated with amplifier 71 of FIGURE 4b, FIGURE 7 (also on the same sheet as FIGURE 4b) shows a plot of records shown by the recorder of FIGURE 4b, FIGURE 8 shows a partly sectioned view of a sample injector with heat exchanger, FIGURE 9 shows a front elevation of a filter changing apparatus, FIGURES 10 and 11 show end and side views respectively of the gating generator of FIGURE 3, and FIGURE 12 is a schematic circuit diagram associated with the generator.

Having reference to FIGURE 1 there is shown the transmission spectra in the form of extinction lengths for $H_2O$, HDO and $D_2O$. (The extinction length is the thickness of material required to reduce the incident radiation to 10% of its initial value.) It can be seen from the curves that the transmission of electro-magnetic radiation in the region of $2.5\mu$ to $4.5\mu$ changes as the $H/D$ ratio of the water changes. For small changes in the deuterium content of natural water, the transmission change is greatest at about $4\mu$, where the length for $H_2O$ exceeds that for HDO by a factor of 40. The relatively long $H_2O$ extinction length means that $H_2O$ is relatively transparent, while the short HDO extinction length means that a small amount of HDO will greatly reduce the transmission at this wavelength. It can also be noted from the curves of FIGURE 1 that the transmission at about $3.7\mu$ is the same for each of the types of water.

Ordinary natural water contains a small amount of heavy water, about 150 parts per million. Since the molecules of water readily exchange hydrogen atoms, the $D_2O$ molecules virtually disappear, each producing two HDO molecules. At equilibrium, the concentration of the molecular species are given by $$\frac{(HDO)^2}{(D_2O)(H_2O)} = 3.80$$

at 25° C. and the ratios of the concentrations are approximately $H_2O:HDO:D_2O = 1:3 \times 10^{-4}:2 \times 10^{-8}$ for natural water.

Having reference to FIGURE 2, two Fabry-Perrot filters can be chosen having transmission envelopes in the region of $3\mu$ to $4\mu$ as shown at 10 and 11 respectively. There will be additional responses due to harmonics in the range of $1\mu$ to $3\mu$ as shown at 12. A long wave pass filter can also be chosen which has a transmission curve 13.

If now a long wave pass filter is superimposed with each of the Fabry-Perrot filters in turn the responses 10 and 11 can be selected alone, and filters passing only in the bands represented by curves 10 and 11, can be produced. Thus using these filters the transmission properties of one or more samples of water can be measured effectively at the wavelengths $3.7\mu$ and $4.0\mu$ and the difference in transmission at $4.0\mu$ will include the effect of the deuterium present (mostly as HDO when in small quantities) whereas that at $3.7\mu$ will not.

The transmission characteristics of a film of water $x$ microns thick, containing an HDO concentration $c$, is $$F_w = \exp - \left( \frac{cx}{L_{HDO}} + \frac{(1-c)x}{L_{H_2O}} \right)$$

If light of intensity I is incident upon two water samples which are rapidly interchanged, the transmitted light, $IF_w$ will be modulated by an amount $$\Delta IF_w = -IF_w \cdot \frac{x\Delta c}{L}$$

where $\Delta c$ is the difference in concentrations of the two water samples, and $$L^{-1} = L_{HDO}^{-1} - L_{H_2O}^{-1}$$

The modulation will be a maximum when $$1/x = c/L_{HDO} + (1-c)/L_{H_2O}$$

For natural water, $c \approx 3 \times 10^{-4}$, and since the ratio of the absorption lengths never exceeds 40, the optimum cell thickness between windows 19 is $L_{H_2O} \approx 65\mu$. The sensitivity changes relatively slowly with cell thickness: doubling $x$ reduces $\Delta I$ by only 25%.

Referring to FIGURE 3 there is an apparatus for practising the invention. A sample chamber 20 with infrared transparent windows 19 can be fed through a line 21 with reference sample water having a known deuterium concentration and from a line 22 with test sample water. These samples are caused to flow alternately through lines 23 and 24 suitably by means of a pump 25 described in FIGURE 8 which injects water samples into 23 and 24 alternately. Light from an infrared source 27 is allowed to pass through the sample chamber 20, by way of sapphire window 19 and a similar window on the opposite side, through wave band selecting filters 30 or 31 (comprising composite Fabry-Perrot and band pass filters as described above) in mounting sector 32 to a PbSe detector 33. The signal received by the detector 33 is amplified in 34 and passes to a modulation detector 39 (which receives a gating signal from generator 35), and thence to ratio recorder 41. The output of amplifier 34 also passes to mean intensity detector 40 and to recorder 41.

The apparatus of FIGURE 3 can be seen in more detail in FIGURES 4a and 4b. The infrared source 27 may suitably be constructed as shown in FIGURES 6 and 7 of Canadian Patent 643,448 in the names of John G. Bayly and William H. Stevens as inventors, entitled "Apparatus for Determining the Quantity of Contaminant in a Substance" and comprises essentially a wire or strip which may be heated by passing a suitable electrical current through it. The radiation from source 27 passes through the sample chamber 20 and thence through one or other of the composite filters mounted in sector 32. The radiation impinges upon the detector 33 which may for example be one of the R type Ektron lead selenide detectors (made by Eastman Kodak of Rochester, New York), whose resistance falls as the intensity of illumination increases and which has good sensitivity over the range $1\mu$ to $4.5\mu$. Sapphire windows may be placed over both source 27 and detector 33. The emission of the source and sensitivity of the detector are substantially constant per unit wavelength over the range $3.6\mu$ to $4.1\mu$. An optical system may be included as a refinement for collimating and focussing the light from the source. Since the wavelengths of interest are $3.6\mu$ to $4.1\mu$ arsenic trisulphide and Ir-tran may also be used for the windows of the chamber 20. The halides are generally too soft and soluble and glass and quartz are too opaque except in very thin plates. The detector 33 is fed through a resistance 45 from a stable power supply 46. Variations in incident radiation will therefore vary the potential at 47 at the input to preamplifier 48.

The output from amplifier 48 feeds through a capacitor 49 having a low impedance at the frequencies considered and a series resistor 50 to the input of amplifier 55 over which negative feedback is applied from input to output by resistor 57. The output from this amplifier feeds a band pass amplifier 60 through capacitor 61 and series resistor 62. The band pass can be obtained by applying negative feedback by means of a twin T filter 63 which reduces the gain of amplifier 60 at all but those frequencies it is intended to pass. The twin T filter is shunted by a pair of normally closed contacts $Kp_1$. The output from amplifier 60 also feeds a transformer 65 having a centre tapped output winding 66. By means of the moving relay contact 67, outputs in one phase or the other can be obtained from the winding 66 at contacts 68 and 69.

The signal appearing on contacts 67 is then passed through resistor 70 (see FIGURE 4b) to amplifier 71. This amplifier forms an integrator circuit with resistor 70 for capacitors $Ca$ and $Cb$. Relay contacts $Kb_3$ and $Kb_4$ are series connected between the input and output of amplifier 71 and to the junction 72 between them are series connected a resistor 74 and one side of capacitor $Ca$. The other side of capacitor $Ca$ connects to the junction between contacts $Kb_1$ and $Kb_2$ also series connected between output and input of amplifier 71. Contacts $Ka_1$ shunt contacts $Kb_3$. One side of capacitor $Cb$ is connected to the input of amplifier 71 and the other side is joined to the slider of a potentiometer 73 connected between the output of amplifier 71 and ground. The output of amplifier 71 is fed through normally open contacts $Ka_2$ to a junction 75 which can be grounded through normally closed contacts $Ka_3$. The junction 75 feeds the upper end of a potentiometer 76, the lower end of which is grounded.

Returning to FIGURE 4a, the output of amplifier 55 is also fed to a rectifier 80 through series resistor 81 and capacitor 82. Rectifier 80 supplies a charging capacitor 83 which in turn feeds a long time constant integrating circuit for a condenser 84 comprising a charging resistor 85, a high gain amplifier 86 and feed back resistor 87. The output from amplifier 86 is taken to a potentiometer 88 (see FIGURE 4b), whose lower end is grounded.

The slider 90 of potentiometer 76 and the slider 91 of potentiometer 88 are taken as inputs to a difference amplifier 92. A servo motor 93 then drives slider 90 from the output of amplifier 92. A pen 95 is connected to slider 90 and bears against a moving tape 96 so that the position of the slider is recorded on the tape.

The recorder circuit 97 indicates by the position of slider 91 (and pen 95) the ratio of the voltage on slider 90 to that at the upper end of potentiometer 88. Thus if we assume that the voltage $a$ exists on slider 90, $b$ on the upper end of potentiometer 88 and that $\theta$ is the instantaneous setting of the slider 91 of potentiometer 88 (i.e., if $r$ is the resistance of potentiometer 88, then $r\theta$ is the resistance between ground and slider 91). Then, since the difference amplifier 92 will produce an output unless its inputs are equal, the motor 93 will be driven until $a=b\theta$, i.e. until $\theta$ is proportioned to $a/b$.

In FIGURE 3 the sector 32 mounting filters 30 and 31 is driven by a motor 110 shown in FIGURE 4a, which is exemplified as a four pole AC induction type fed from a power supply 111. The direction of rotation of the motor can be changed. Two poles of the motor carry winding 112 and two poles carry winding 113. The windings 112 and 113 are connected to one side 119 of power source 111. The other ends of the windings are joined through a phase advancing network comprising a capacitor 114 and resistor 115. The other side 118 of the power supply 111 is led to the junction 117 between a pair of normally open contacts $C1_1$ and a pair of normally closed contacts $C1_2$. These contacts are cam operated alternately from a timing motor (not shown). When $C1_1$ is closed and $C1_2$ is opened the motor rotates in one direction and when $C1_1$ is open and $C1_2$ is closed it is reversed. Limit switches 176 and 179 are provided in series with connections from the windings to the contacts $C1_1$ and $C1_2$ to shut off the motor when the sector 32 reaches either one or other limit.

The winding 122 of relay $Ka$ is connected through cam contact $C2_2$ across the power supply wires 118 and 119, while winding 121 of relay $Kp$, is connected to the same power supply through the other contact $C2_1$ on the same cam. The winding 120 of relay $Kb$ is connected between wire 119 and wire 118 through contacts $C1_1$. The contacts $C2_1$ and $C2_2$ are operated by a cam driven from the same timer motor which operates contacts $C1_1$ and $C1_2$.

The profiles of the two cams are shown for $C1$ and $C2$ respectively in FIGURES 5b and 5c, and the relay operations in 5d and 5f. Starting at time $t_0$ cam $C1$ has closed $C1_1$ and opened $C1_2$ and cam $C2$ is closing $C2_1$ and opening $C2_2$. This allows $Ka$ to release and then $Kp$ is already closed. At time $t_1$ cam $C2$ causes $C2_1$ to open but since the cam is not fully cut at this point $C2_2$ does not close. $Kp$ thus releases but $Ka$ remains released. At time $t_2$ cam $C1$ releases $C1_1$ and makes $C1_2$. $Kb$ releases and motor 110 is energized and changes filters 30 and 31 in a manner to be described later. After the filters have changed cam $C2$ causes $C2_1$ to remake and operates $Kp$ at time $t_3$. At time $t_4$ cam $C2$ opens $C2_1$ and closes $C2_2$ releasing $Kp$, and operating $Ka$. At time $t_5$, cam $C1$ closes $C1_1$ and releases $C1_2$ so that the motor 110 reverses the filters and $Kb$ operates. At time $t_6$ cam $C2$ opens $C2_2$ to release $Ka$ and closes $C2_1$ to operate $Kp$ to return the circuit to the initial condition $t_0$. In the prototype if $t_0$ is taken as 0 secs., time $t_1$ was about 54 secs., $t_2$= 55 secs., $t_3$=60 secs., $t_4$=114 secs., $t_5$=115 secs. and $t_6$=120 secs.

Let us now consider the operation of this device having reference also to FIGURES 6a to 6d. Assume that infrared source 27 is energized by the passage of current from current source 28 and that test samples and reference samples of water are led into the chamber 20 alternately at a rate (in the prototype of about 9 cycles per second). For best signal to noise ratio the modulation frequency should be high and the bandwidth small. The modulation frequency is limited by the hydraulic problems involved in rapidly interchanging water samples. Gating signals are generated in the generator 35 and in synchronism with these, contact 67 is switched into connection with contacts 68 and 69 alternately as one or other sample is led through the chamber 20. Details of a suitable gating generator system are shown in FIGURES 10 and 11. Alternatively the teaching of the above mentioned patent of John G. Bayly and William H. Stevens with reference to FIGURES 2, 3, 4 and 5 of that patent may be used. Using the teaching the system of the patent the contact 67 is part of the armature of a two position relay which is driven to one and other of its positions by the alternate conducting and nonconducting state of a pair of photo-sensitive devices which are illuminated alternately by the obturation of on and other alternately by a rotating shutter carried by a shaft whose position is related to that of the shaft operating the pump or valve 45.

The gating signals might also be generated by the alternate closing and opening of a pair of control contacts by a cam on the shaft connecting the pump or valve 25 and the motor 26. The contact 67 may be mounted on the armature of a relay which is energized when the cam closes the control contacts and is released when the control contacts are opened. The generator shown in FIGURES 10 and 11 will be described later.

Let us now assume that the filter presented by sector 32 is that which allows transmission in the region of $3.7\mu$. There will thus be a variation in radiation detected by the detector 33 as the reference or test sample is in the chamber 20. The detector output as shown with reference to FIGURE 5a is composed of a steady state signal $ViB$ and an alternating modulation component $VmB$. The modulation component will be due to dirt and other absorbing substances in the two samples such as suspended and dissolved contaminants e.g. $Al_2O_3$ morpholine, hydrazine, $Ca(HCO_3)_2$ but not to the differing concentrations of deuterium because the $3.7\mu$ filter passes only those wavelengths which are approximately equally well transmitted by ordinary water and by water containing extra heavy water. The detector signal is passed through amplifiers 48 and 55 but the filter 63 (of narrow bandwidth to improve signal to noise ratio) selects only the modulation component for passage to transformer 65. The synchronous detector 67 rectifies the modulation component by choosing the output at contacts 66 and 69 alternately as one or other sample is in the chamber 20.

Referring now to FIGURES 6a to 6d the instantaneous circuit conditions associated with amplifier 71 are shown. At time $t_0$, relay $Ka$ is de-energized. This opens $Ka_1$, through which any charges which may have existed on $Ca$ and $Cb$ have been discharged. The circuit is now in the $b^*$ mode, in which relay $Ka$ is released. $Kb$ is energized, as shown in FIGURE 6a. (These modes are identified in FIGURES 5 and 6a to 6d.) Assume arguendo that slider 69 is at the bottom of its travel so that it is grounded. The signal on contacts 67 feeds through resistor 70 to the virtual ground at the input of amplifier 71 and charges capacitor $Ca$. Amplifier 71 acts as a Miller integrator with capacitor $Ca$ (resistor 74 being merely of low value for current limiting when $Ca$ is discharged later). The condition represented by FIGURE 6a corresponds to that when the $3.7\mu$ filter is in position and the charge that builds up will be proportional to the modulation amplitude $VmB$ and will equal say $v_1$. Subsequently the $4.0\mu$ filter is brought in front of detector 33 and the circuit of amplifier 71 changes to the $ab$ mode, FIGURE 6b ($Kb_3$ and $Kb_2$ closed, $Kb_4$ and $Kb_1$ open). The output of detector 33 is now (see FIGURE 5a) $ViA$ with modulation component $VmA$. $Ca$ has been reversed and the charge flowing in through resistance 70 will be added to $-v_1$.

The charging period in the condition of FIGURE 6a is the same as that in FIGURE 6b and if the illumination by source 27 remains substantially constant $Ca$ will, at time $t_4$, be charged to a voltage proportional to the difference in absorption between the test and reference samples due only to deuterium concentration differences. (In actual fact there will be known errors due to certain wavelength dependent other absorbents for which $Cb$ has been included and which will be described later.)

At time $t_4$ the circuit changes to mode $a*b$, FIGURE 6c, and the voltage across $Ca$ is fed from the output of amplifier 71 to the potentiometer 76 of the recorder. The charge is removed from capacitor $Ca$ in mode $a*b*$ which starts at time $t_5$, when relay $Kb$ energizes and closes $Kb_4$ while $Ka_1$ is closed. This is the condition shown in FIGURE 6d when the input and output of amplifier 71 are connected together and capacitors $Ca$ and $Cb$ are effectively shorted out.

The record of the recorder can be seen in more detail in FIGURE 7. Each of the pulses 100 represents the movement of the pen 95 during the time $t_4$ to $t_5$ for each successive test cycle. By way of explanation at 101 can be seen in broken lines the path that pen 95 would follow if potentiometer 76 were continuously connected to the output of amplifier 71. At 102 is the charging period from $t_0$ to $t_1$. At 103 $Ca$ is reversed and at 104 is the charging period from $t_3$ to $t_4$. Because $Ka$ is only operated during period $t_4$ to $t_6$ the excursions 102, 103 and 104 are not recorded.

Consider now the situation when "dirt" such as $Al_2O_3$, morpholine. hydrazine, $Ca(HCO_3)_2$ and others are present in the samples. Slider 69' is set so that part of the output from amplifier 71 is applied to condenser $Cb$, as shown in FIGURE 6a. The effect of this is to place a capacitor in parallel with $Ca$ so that the voltage to which it charges is less than $v_1$ as considered before. When the circuit switches to that of FIGURE 6b the charge on $Cb$ will reduce the voltage on $Ca$ even further. Subsequently $Ca$ and $Cb$ will charge up to the final voltage. The effect therefore of adding $Cb$ has been to reduce the effect of the modulation signal at $3.7\mu$ with respect to that at $4.0\mu$ to an extent dependent upon the setting of slider 69'. This therefore compensates for impurities which show a greater absorption at $3.7\mu$ than at $4.0\mu$. If the amount of the impurity absorption is known, 69' can be accurately set so that the output at the end of the $a*b*$ mode (FIGURE 6d) is independent of the amount of dirt in the water, and depends only on the deuterium concentration difference between test and reference water samples. Modifications to the circuit will suggest themselves to those skilled in the art for impurities which show less absorption at $4.0\mu$ than at $3.7\mu$.

Referring back to FIGURE 4a, whenever the filters 30 and 31 are interchanged a pulse appears at the output of amplifier 55 because the illumination of detector 33 drops to zero. Although this pulse is removed by contacts $Kp_1$ at amplifier 60 it is allowed to pass through rectifier 80 to charge up capacitor 83. The charge leaks through resistance 85 to the virtual ground at the input of amplifier 86 and produces an output $Vi$ at this amplifier and across condenser 83 related to the mean value of the input pulses over a period determined by the time constant of resistor 87 and condenser 84. It will be clear that this mean is proportional to that of the transmission through filters 30 and 31, i.e. of $ViB$ and $ViA$.

The mean value $Vi$ and the modulation difference at the two wavelengths are thus applied to potentiometer 88 and 76 respectively and their ratio is recorded.

Reference to FIGURE 8 shows an example of a suitable pump for the sample chamber 20. Liquid to be tested from line 129 which may be fed by a selector valve from a number of different test points and standard sample water from reservoir 128 and pipe 123 respectively is led to a heat exchanging coil system 124, contained in a water bath 125, maintained at a constant temperature by thermostat 126 and heating coil 127 respectively. Both water samples should be at the same temperature to remove temperature dependent differences in transmission. To prevent condensation the temperature should be above the dew point. The water from pipe 129 leaves the heat exchanger by pipe 21 and that from reservoir 128 by pipe 123. It is desirable to place a filter in each of pipes 129 and 123 to remove impurities since the passages in cell 20 are necessarily small. Sintered stainless steel filters with a pore size of $5\mu$ to $8\mu$ has been found satisfactory. If the water contains materials which may coagulate on heating or cooling other special precautions may be necessary.

The water in pipes 21 and 22 is led to pump 25 which is shown as a double diaphragm type. Water from 21 enters space 130 through check valve 131 and pressure on diaphragm 132 by piston 133 then forces this water out through check valve 134 into pipe 23. Water can be ejected in a similar manner from pipe 22 into pipe 24 by piston 135. Since pistons 133 and 135 are mounted on the same yoke 136, water is ejected alternately through pipes 23 and 24 as the yoke rocks about pivot 137 under the action of eccentric cam 140 mounted on shaft 139 of motor 26.

The check valves may be omitted if desired so that apparatus 25 becomes a flow modulator rather than a positive displacement pump.

In the prototype the cell 20 must be flushed out by each sample in $\frac{1}{18}$ of a second. To remove the old sample and replace it by the new one required that four times the volume of the cell pass through. The flow rate in that apparatus was 2 cm.$^3$/sec.

Referring to FIGURE 9 the sector 32 mounting the infra-red filters is supported freely to rotate on a shaft 170, passing through a mounting plate 178. The shaft 170 drives a lost motion linkage 171 comprising a key member 172 fixed to the shaft. One of the infra-red filters 31 is mounted so that when the sector 32 is against one stop 175 the filter 31 is accurately aligned with an aperture 169 in the plate 178. When the sector is against the stop 177 the second filter 30 becomes accurately aligned with the aperture 169.

When the sector 32 is to be changed from the position shown in FIGURE 9 to that in which the filter 30 is aligned with aperture 169, the motor 110 (see FIGURE 4a) is started and shaft 170 is rotated clockwise, the key 172 engages shoulder 180 and the sector starts to move into the new position. However as the centre of gravity of sector 32 passes over the centre line of the shaft 170 there will be a tendency for the sector to fall into the new position, which will be unimpeded by the lost motion linkage. Changeover is thus accomplished more rapidly than if the shaft were required to drive the sector fully into position against stop 177, and since the sector is resting freely against the stop it is accurately positioned by the stop. After the sector strikes stop 177 a cam on the motor shaft 170 depresses a limit switch 179 and the motor ceases driving.

When the sector is to be returned to the first position the motor 110 is reversed but no movement of the sector will take place until key 172 engages shoulder 181. The sector will subsequently drop into the position of FIGURE 9, when the centre of gravity passes over the centre line of shaft 170. The motor stops when a second limit switch 176 is operated by the motor cam. The advantage of this lost motion linkage is that the change from one filter position to the other is achieved more quickly than if the motor were required to drive the sector all the way over to its new situation and the filters are accurately positioned by the stops 175 and 177. By operating the limit switches from a cam fixed to the motor shaft instead of to the sector, the sector positions are not affected by the forces required to operate the limit switches.

The gating generator 35 is shown in more detail in FIGURES 10 and 11. The shaft 144 is driven by the motor 26, extends into the generator and carries a hollow cylindrical drum 145. This drum has an odd number of longitudinal slots 146 parallel to its axis formed in its surface. The drum is further received within an outer enclosing cylindrical casing 147 in which two oppositely formed longitudinal slots 148 running parallel to its axis are also located. The axis of the drum 145 and casing 147 are coincident. A bulb 157 shown in FIGURE 10 is placed with its filament on the axis of the drum and casing covering the slots 148 and mounted on the outside of casing 147 are a pair of photo-sensitive cells 149 and 150 such as the Eastman Kodak Ektron types N, O, or P made of a thin film of lead sulphide deposited on an insulator or the National Semiconductors Laboratories type NSL-3 cadmium sulphide cells, similarly mounted and whose resistance decreases with illumination by visible light. The two photocells 149 and 150 are now connected as shown in FIGURE 12 in a circuit which includes the winding 151 of a two state relay whose armature is contact 67 of FIGURE 4a. The cells 149 and 150 are series connected across a source of direct current 152. The junction 153 between the two cells is connected through winding 151 to a point 154 whose potential is established at approximately the mean value of the potential at 153. Potential at point 154 is stabilized by connecting it through capacitors 155 and 156 to opposite sides of the battery 152.

If now the cells 149 and 150 are illuminated alternately as will be the case when drum 145 has an odd number of slots 146 cut into it, the contact 67 will be moved first into connection with contact 68 and then contact 69 alternately, as one or other of the cells 149 or 150 is illuminated. Further details of operation of the type of circuit of FIGURE 12 may be obtained by consulting Canadian Patent 643,448 mentioned above with reference to FIGURES 4 and 5 of that patent.

In the prototype it was found desirable to have a 9:1 reduction ratio between shafts 139 and 144 to rotate the shaft 144 at one cycle per second and to cut 9 slots in drum 145. This gave nine measurements of transmission through both test and reference samples every second because shaft 139 caused the pump yoke 136 to complete 9 oscillations every second. By mounting the drum 147 so that it can be rotated through several degrees with respect to the axis of shaft 139, the system may be synchronized so that the contact 67 connects with contacts 68 and 69 at the correct times to measure transmission through test and reference samples alternately, and to avoid pick-up while the samples are changing from one to the other. In another version of the prototype one single shaft was used for 139 and 144, and the number of slots 146 was reduced from 9 narrow ones to one broad one.

Although specific values for certain components have been given in FIGURES 4a and 4b, these are merely by way of example and invention is not restricted to the use of these values.

I claim:
1. An apparatus for measuring the concentration of a specific contaminant in a substance wherein a mixture of said substance and contaminant shows a first absorption length in one wavelength band of the electromagnetic radiation spectrum, and a second absorption length in a second wavelength band dependent upon the concentration of the contaminant which comprises, a sample cell, means for illuminating said cell, means for detecting illuminating radiation passing through samples in said cell, means for placing first and second samples alternately in said cell, said first sample being of said substance containing a known concentration of the contaminant and said second sample being of said substance containing an unknown concentration of contaminant, a first and second filter for permitting radiation transmission in said first and second wavelength bands respectively, means for interposing said first and second filters between said illuminating means and said detecting means alternately for filtering illumination passing through said cell, a modulation detector for detecting the difference in output from said detecting means when said first and then said second samples are in said cell, and means for comparing the output from said modulation detector when said first filter is in position and subsequently when said second filter is in position thereby producing a compared output, said compared output being dependent upon said unknown contaminant concentration.

2. Apparatus as defined in claim 1 said placing means operatively alternating said samples in said cell in a period which is short compared with the period of alternation of said filter interposing means.

3. Apparatus as defined in claim 1 comprising a pump for injecting said samples as liquid alternately into said cell.

4. Apparatus as defined in claim 3 comprising heat exchanger means for bringing samples for injection by said pump to equal temperatures.

5. Apparatus as defined in claim 2 including means for integrating the output from said modulation detector over a time period, whilst said first filter is in position, and means for subsequently integrating the output from said modulation detector whilst said second filter is in position, said comparing means comprising means for subtracting said first integrated output from said second integrated output for producing said compared output.

6. Apparatus as defined in claim 2 comprising means for determining the mean output from said detecting means, and recorder means for recording the ratio of said compared output to the determined mean.

7. Apparatus as defined in claim 6, said first filter passing in a wavelength band at $3.7\mu$ and said second filter passing in a wavelength band at $4.0\mu$.

8. Apparatus as defined in claim 5 comprising integrator weighting means for altering the integrated output obtained whilst said first and second filters are in position, and means for choosing the value of said weighting means for correcting for other contaminants which are wavelength dependent absorption contaminants and of known concentration.

References Cited
UNITED STATES PATENTS

| | | | |
|---|---|---|---|
| 2,486,622 | 11/1949 | White | 88—14 |
| 2,764,536 | 9/1956 | Hutchins | 202—206 |
| 3,153,722 | 10/1964 | Bayly et al. | 250—43.5 |
| 3,329,821 | 7/1967 | Lesage | 250—206 |

RALPH G. NILSON, *Primary Examiner.*

T. N. GRIGSBY, *Assistant Examiner.*